United States Patent [19]

Donahue

[11] 4,337,119

[45] Jun. 29, 1982

[54] OIL RECLAIMING APPARATUS HAVING ULTRAVIOLET STERILIZER THEREIN

[76] Inventor: Jerome T. Donahue, 970 S. Waterville Rd., Oconomowoc, Wis. 53066

[21] Appl. No.: 252,946

[22] Filed: Apr. 10, 1981

[51] Int. Cl.³ .................. C10G 31/06; C10G 31/09; C10G 32/00
[52] U.S. Cl. ............................... 196/46; 196/46.1; 196/128; 210/180; 210/184; 250/438
[58] Field of Search ............... 422/24; 196/46.1, 121, 196/128, 46; 210/189, 182, 184; 250/429, 436, 438

[56] References Cited

U.S. PATENT DOCUMENTS

| | | | |
|---|---|---|---|
| 1,235,698 | 8/1917 | Keyes | 250/434 |
| 2,070,453 | 2/1937 | Rodman | 196/128 X |
| 2,173,631 | 9/1939 | Niedens | 219/131 |
| 2,207,399 | 7/1940 | Gaertner | 210/43 |
| 2,346,042 | 4/1944 | Morris | 210/122.5 |
| 2,377,988 | 6/1945 | Braun | 210/122.5 |
| 2,428,939 | 10/1947 | Morris | 210/122.5 |
| 2,785,109 | 3/1957 | Schwalge | 196/15 |
| 2,839,196 | 6/1958 | Schwalge | 210/180 |
| 3,246,144 | 4/1966 | Beall et al. | 250/43 |
| 3,550,781 | 12/1970 | Barrow | 210/180 |
| 3,616,885 | 11/1971 | Priest | 196/128 |
| 3,837,800 | 9/1974 | Wood | 210/64 |
| 4,102,645 | 7/1978 | Meacham, Jr. et al. | 21/102 |
| 4,116,630 | 9/1978 | Meacham, Jr. et al. | 422/24 |
| 4,141,686 | 2/1979 | Lewis | 250/436 |

Primary Examiner—Bradley Garris
Attorney, Agent, or Firm—Quarles & Brady

[57] ABSTRACT

An apparatus for reclaiming lubricating oil which includes a housing having an evaporation plate dividing the housing into an evaporation chamber and a filter chamber, passages through the evaporation plate so filtered oil can flow into the evaporation chamber, a heater for heating the evaporation plate to cause volatile contaminants to leave the oil and an ultraviolet radiation source which directs sufficient radiation upon the oil to sterilize it.

2 Claims, 5 Drawing Figures

OIL RECLAIMING APPARATUS HAVING ULTRAVIOLET STERILIZER THEREIN

The present invention relates to an apparatus for reclaiming lubricating oil by removing water and other volatile contaminants and sterilizing the oil.

DESCRIPTION OF THE PRIOR ART

Petroleum oil is a valuable natural resource and for many uses such as lubricating oils it is the product of choice for most applicatons. The recent dramatic increases in petroleum prices have created an increased interest in the recycling and reusing of used petroleum oil lubricating oils.

Lubricating oils under normal use conditions generally do not wear out; they are replaced because they become contaminated with dirt, metal particles, condensates, water, other hydrocarbons an microorganisms. The contamination of lubricating oil is a major cause of wear and deterioration of equipment.

The larger solid contaminants in oil such as dirt, metal particles and the like may be readily removed by conventional oil filters. However, the liquid contaminants such as condensates, water and other hydrocarbons frequently become emulsified in the lubricating oil and cannot be removed by such filters. Oil reclaiming devices have been designed to remove the volatile containers.

In the Priest U.S. Pat. No. 3,616,885 titled "Oil Reclaimer" issued Nov. 2, 1971, an oil reclaiming apparatus is described which de-emulsifies the oil and removes the volatile contaminants. The apparatus basically comprises a canister having a conventional particle filter and an evaporation plate. The lubricating oil is forced upwardly into the particle filter in the canister, through a plurality of capillary openings in the evaporation plate and into an upper evaporation chamber which is heated and vented to the atmosphere. The evaporation plate of the Priest patent comprises a generally truncated cone structure having a top surface with a plurality of substantially flat annular concentric vaporization rings. The lubricating oil is forced from the particle filter through the capillary openings in the plate which terminate in expansion cups in the top surfaces of the evaporation plate. De-emulsification of the volatile contaminants in the oil is accomplished by forcing the oil through the small capillary openings and allowing it to expand in the expansion cup before spreading over the top or vaporization surface of the evaporation plate. The oil film as it flows across the top surface of the plate is then heated to vaporize volatile diluents therefrom and the purified oil is collected for reuse.

The Priest device and similar prior art oil reclaiming devices are effective in removing volatile contaminants such as water and hydrocarbons from the oil, but they do not remove the microorganisms which can grow and multiply in the oil to form undesirable condensates and other by-products which can interfere with the lubricating properties of the oil and reduce its useful life.

Therefore, a need exists for a simple, inexpensive oil reclaiming device which not only removes particle and volatile contaminants but which also sterilizes the oil to stop or inhibit undersirable microorganism growth.

SUMMARY OF THE PRESENT INVENTION

It is the primary object of the present invention to disclose a simple, compact, improved, oil reclaiming apparatus which removes particle and volatile contaminants from the oil and which also sterilizes the oil.

The improved oil reclaiming apparatus of the present invention includes a housing having filter means for removing solid particles from the oil to be reclaimed, heating means including an evaporation plate and heater for heating the oil to drive off volatile contaminants and an ultraviolet radiation source which directs sufficient radiation upon the oil flowing across the evaporation plate to effectively sterilize the oil.

In a preferred embodiment of the invention, the top surface of the evaporation plate is covered with a wire mesh screen which causes the oil to flow as a thin film over the top of the evaporation plate where it is exposed to heat to drive off the volatile contaminants and to the ultraviolet radiation to kill any microorganisms which may be present in the oil.

Other objects an advantages of the apparatus of the present invention will be apparent to those skilled in the art from the description and drawings which follow:

BRIEF DESCRIPTION OF THE DRAWINGS

In the drawings,

In FIGS. 1 to 3 of the drawings, an oil reclaiming apparatus 10 is seen to comprise a housing 11 having a closed bottom 12. Centrally located in the closed bottom 12 of the housing 11 is an oil inlet 13 which is provided to introduce oil into the apparatus 10. The housing 11 is partially filled with filter material 14, which may be cotton fibers or lint. Positioned above the filter material 14 within the upper portion of the housing 11 is an evaporation plate 15. The bottom of the evaporation plate 15 may be flat but is preferably substantially flat with a large central recess 16. The periphery of the evaporation plate 15 substantially conforms to the internal diameter of housing 11. In the preferred embodiment there is a perforated cover 17 for the recess 16 which cooperates with the evaporation plate 15 to effectively divide the housing 11 into a filter compartment 18, a filtered oil collection chamber 19 and an evaporation chamber 20.

As seen in FIG. 1, the filter compartment 18 is substantially filled with the fibrous filter material 14 and a porous felt pad 21 is positioned between the fibrous filter material 14 and the cover 17 of the evaporation plate 15. A plurality of passages 22 extend substantially vertically upwardly through the evaporation plate 15 and terminate in one of a pair of relatively shallow annular grooves 23, 23' in the top 15a of the evaporation plate 15. Covering the outermost top surface 15a of the evaporation plate 15 except for the annular grooves 23, 23' and the central area of the top 15a within the outermost groove 23 is a wire mesh screen 24 which is held in place by fasteners 25. Oil entering the housing 11 through the inlet 13 and passing upwardly through the filter material 14 flows through the felt pad 21 and the perforated cover 17 into the filtered oil collection chamber 19 and via passages 22 to the annular grooves 23, 23' where it expands. Oil overflowing the grooves 23, 23' flows over the top surface 15a of the evaporation plate 15. The flow of the oil is slowed and thinned or filmed by the wire mesh screen 24. As the oil leaves the convex or domed top 15a of the plate 15, it gathers in an annular channel 26 which leads to the oil outlet 27.

Figure 1:
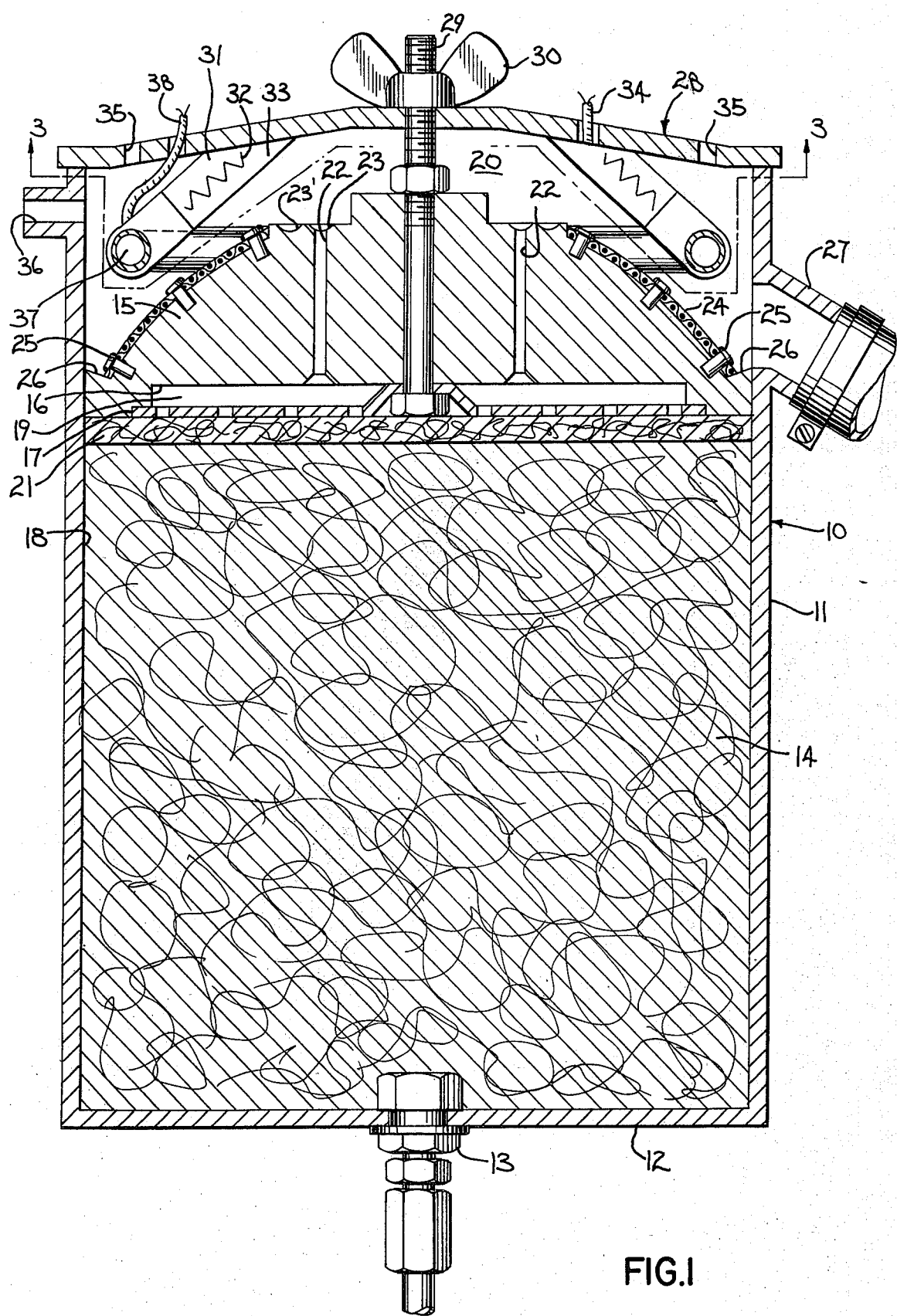
FIG. 1 is a sectional view of the preferred embodiment of the apparatus of the invention.

As seen in the embodiment illustrated in FIG. 1, the top of housing 11 is closed by a cap 28. The cap 28 is secured in place closing the top of housing 11 by a bolt 29 and wing nut 30.

As illustrated in FIG. 1, the evaporation chamber 20 is heated by an annular heater 31 disposed on the underside of the cap 28. The heater 31 is preferably an electrical resistance heater having coils 32 mounted in a support 33. The coils 32 have leads 34 which lead through the cap 28 and may be connected to any suitable power source to supply electrical current to the heating coils 32. The cap 28 is preferably provided with a plurality of vents 35 which allow vapors that collect near the heater 31 to escape from the evaporation chamber 20 to the atmosphere.

As seen in FIG. 1, there is a port 36 near the top of the housing 11 which leads from the evaporation chamber 20 to the atmosphere. As a result, vapors or gases that collect within the evaporation chamber 20 can reach the outside through the port 36 or the vents 35.

Figure 3:
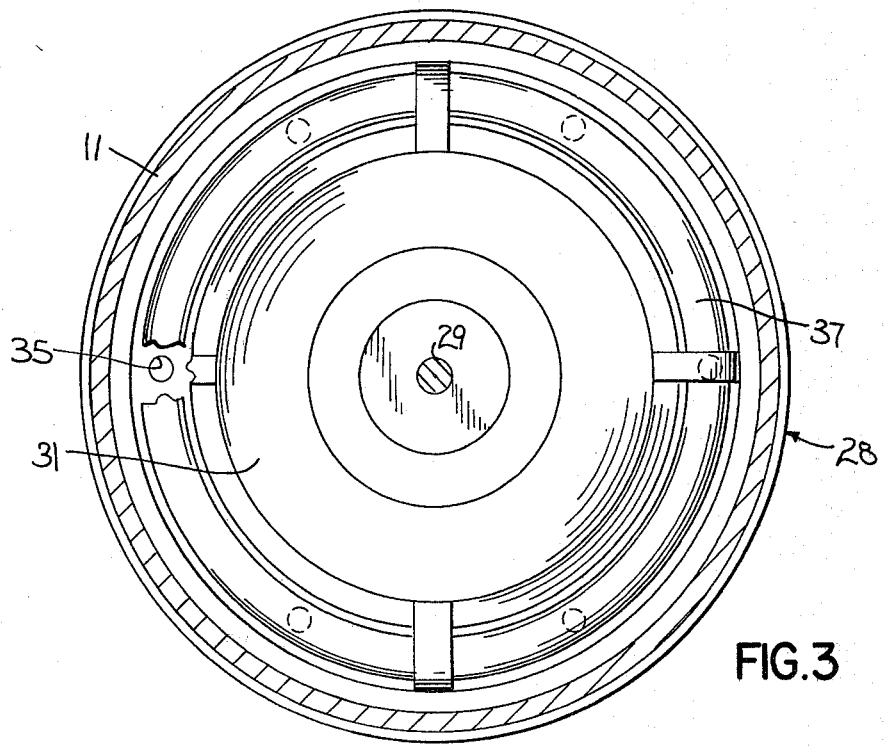
FIG. 3 is a bottom plan view of the cap of the apparatus of FIG. 1.

Referring to FIGS. 1 and 3, it can be seen that mounted in the cap 28 below the heater 31 is a ring shaped ultraviolet lamp 37 which may be connected by leads 38 to a source of electrical power (not shown). The lamp 37 is sized and positioned to direct ultraviolet radiation upon a film of oil as it moves across the screen 24 on the top surface 15a of the evaporation plate 15 to the channel 26.

In use, the oil to be reclaimed is pumped into the filter compartment 18 through inlet 13 and forced upwardly through the fibrous filter material 14 and felt pad 21. When the filter compartment 18 is full, the filtered oil is forced upwardly through the perforated cover 17 into the oil collection chamber 19 and from there via the passages 22 to the annular grooves 23, 23'. The oil expands in the annular grooves 23, 23' and overflows downwardly over the screen 24 covering the top surface 15a of the evaporation plate 15.

As the film of oil flows over the screen-covered top surface 15a of the evaporation plate 15 it is heated by heat radiated from heater 31. The heater 31 is preferably shaped and spaced so that the entire top surface 15a of the evaporation plate 15 is uniformly heated to a temperature between about 175° F. and about 225° F. Preferably the oil on the surface 15a is maintained at a temperature of approximately 200° F. At this temperature the volatile impurities in the oil evaporate therefrom and exit from the evaporation chamber 20 through the vents 35 and the port 36 to the atmosphere. The heated oil as it flows down the top surface 15a towards the channel 27 is exposed to ultravoilet radiation from the ultraviolet lamp 37.

The ultraviolet lamp 37 emits ultraviolet radiation in the region of at least 2537 angstrom units which are lethal to microorganisms. The lamp 37 is preferably a cold cathode mercury vapor lamp which has a higher ultraviolet light output than the conventional hot cathode lamp. The wall of the lamp 37 is preferably of quartz or if of glass it is separated from the evaporation chamber 20 by a relatively thick protective shield of clear quartz which permits ultraviolet rays to be transmitted therethrough substantially without loss. The heated and thus sterilized oil which collects in the channel 26 is drained from the housing 11 via the outlet 27.

The killing power of the ultraviolet radiation is dependent upon the intensity of the radiation and the length of time the microorganisms are exposed to the radiation. Therefore, the flow rate of the oil should be correlated with the intensity of the ultraviolet radiation to assure that the microorganisms are being killed.

Figure 2:
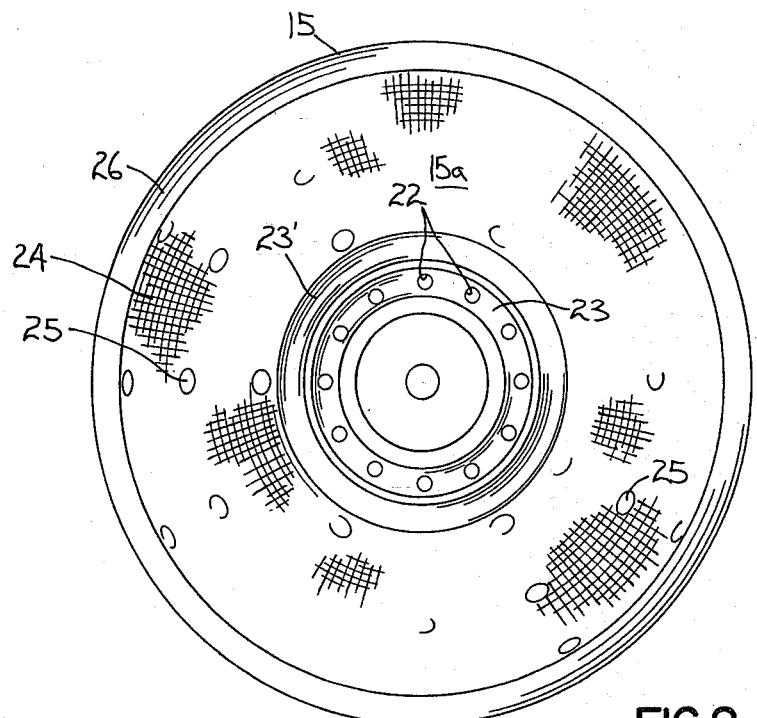
FIG. 2 is a top plan view of the evaporation plate of the apparatus of FIG. 1.
Figure 4:
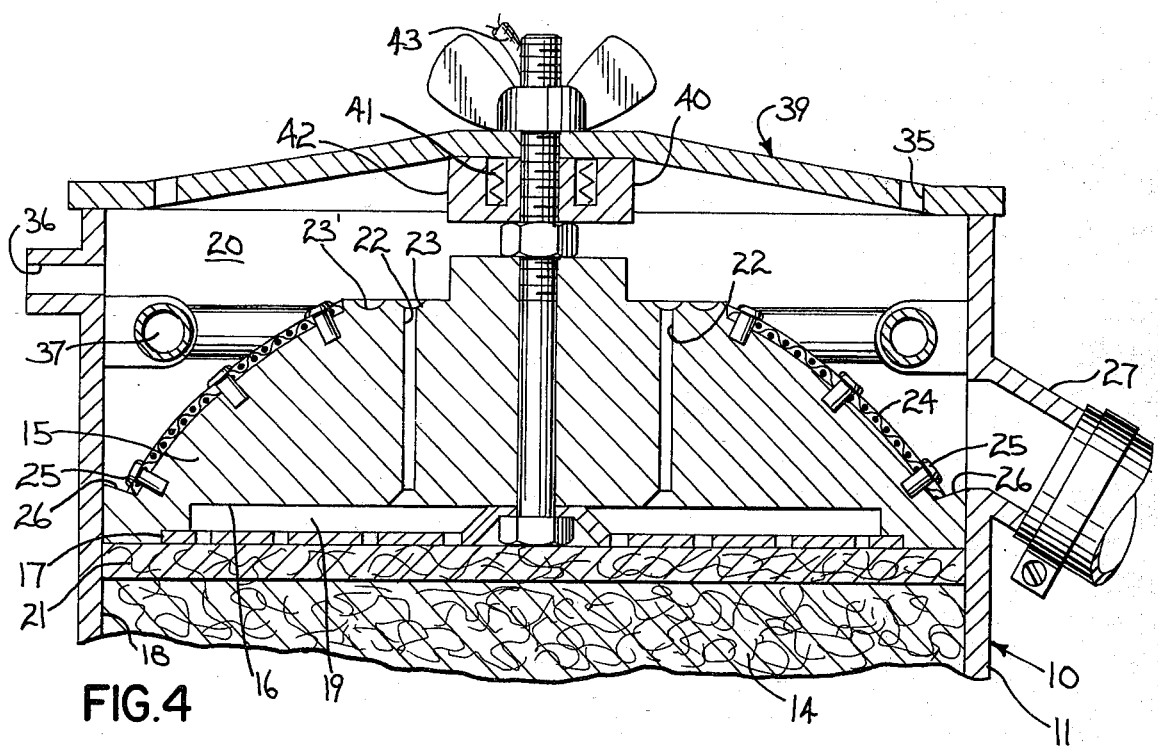
FIG. 4 is a partial sectional view of another embodiment of the present invention.

In FIG. 4 a second embodiment of the invention is illustrated. The evaporation plate 15 and housing 11 in FIG. 4 are substantially identical to that shown and described with reference to FIGS. 1 to 3. However, in the embodiment illustrated in FIG. 4, the cap 39 carries a resistance heater 40 which is adapted to physically contact the top 15a of the evaporation plate 15 and heat the plate 15 by conduction.

The heater 40 includes a resistance heating element 41 carried in a suitable thermally conductive jacket 42. When the heater 40 is in place as shown in FIG. 4 and current passed through leads 43, the resistance heating element 41 generates heat which is conducted to the evaporation plate 15 and maintains it at the desired temperature. The operation of the device of FIG. 4 is essentially identical in all other respects to the device shown and described in connection with FIGS. 1 to 3.

Figure 5:
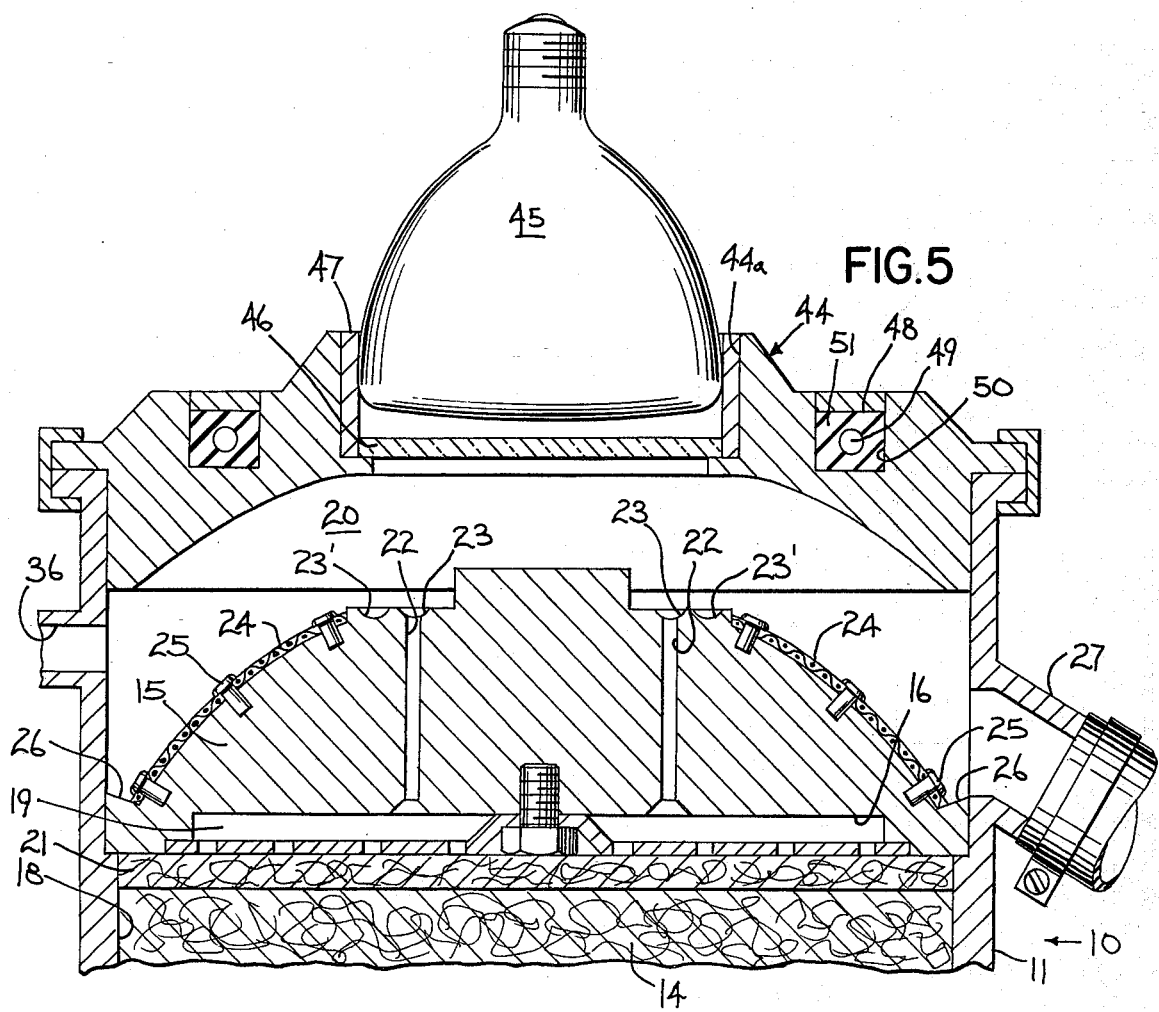
FIG. 5 is a partial sectional of still another embodiment of the invention.

A third embodiment of the invention is shown in FIG. 5. As seen therein the evaporation plate 15 and housing 11 are substantially indentical to that of the previously described embodiments. However, in the embodiment of FIG. 5 the cap 44 differs significantly in that it has a central opening 44a in which there is mounted a conventional ultraviolet light bulb 45. The bulb 45 is positioned so that it will radiate ultraviolet light downwardly onto the oil flowing across the top 15a of the evaporation plate 15. Separating the the glass bulb 45 from the evaporation chamber 20 is a protective shield 46 of clear quartz. The side wall of the bulb 45 is separated from and insulated from the remainder of cap 44 by a ring 47 of insulation which prevents heat and shock from being transmitted from the cap 44 to the bulb 45.

The heater 48 of the embodiment of FIG. 5 also differs from those previously described. The heater 48 is a resistive heating coil 49 positioned in an annular recess 50 in the topside of the cap 44. The resistive heating coil 49 is separated from the cap 44 by suitable electric insulation 51. Th cap 44 which is of a thermally conductive material, preferably aluminum, is heated by the coil 49 and in turn radiates heat upon the oil passing over the top surface 15a of the evaporation plate 15.

While the invention has been described in connection with the specific embodiments shown in the drawings, it is to be understood that a number of changes and modifications may be made without departing from the spirit and scope of the invention. For example, the use of the perforated cover 17 is optional and can be dispensed with if desired. Therefore, it is intended that the invention not be limited except by the claims which follow.

I claim:

1. An apparatus for sterilizing and removing volatile impurities from lubricating oil comprising:
   (a) a container;
   (b) an evaporation plate positioned within said container, said evaporation plate defining the floor of an evaporation chamber within such container;
   (c) a plurality of passages passing through said evaporation plate from the base thereof to the top surface of said plate;

(d) enclosure means for enclosing the top of the container and defining the top of said evaporation chamber;
(e) means for heating the evaporation plate; and
(f) an ultraviolet radiation source positioned above said evaporation plate and below said enclosure means, said ultraviolet radiation source being capable of directing sufficient radiation upon oil passing across the top of the evaporation plate to sterilize said oil;
(g) vent means to permit vaporized materials to escape from said evaporation chamber, and means for conducting the oil from said evaporation chamber.

2. The apparatus of claim 1 wherein the top surface of the evaporation plate is covered with a screen.

* * * * *